United States Patent [19]

Cullen

[11] Patent Number: 5,947,784
[45] Date of Patent: Sep. 7, 1999

[54] APPARATUS FOR PRODUCING TOROIDAL BUBBLES AND METHOD

[76] Inventor: James R. Cullen, 12000 4th St. North, Apt. #42, St. Petersburg, Fla. 33716-1709

[21] Appl. No.: 08/814,327

[22] Filed: Mar. 11, 1997

[51] Int. Cl.⁶ .......................... A63H 33/28; A63H 23/00; F16K 15/00
[52] U.S. Cl. .............................. 446/15; 446/153; 446/19; 137/217; 137/541; 137/854; 119/254; 128/200.29
[58] Field of Search ................................. 446/15, 19, 153; 137/217, 541–543, 854; 119/254; 128/200.11, 200.13, 200.24, 200.25, 200.27, 200.29

[56] References Cited

U.S. PATENT DOCUMENTS

| | | | |
|---|---|---|---|
| 2,579,855 | 12/1951 | Pockel et al. | 137/854 |
| 2,767,510 | 10/1956 | Hopkins . | |
| 2,855,714 | 10/1958 | Thomas | 446/24 X |
| 3,589,603 | 6/1971 | Fohl | 446/24 X |
| 3,651,646 | 3/1972 | Grunau | 61/1 R |
| 4,088,716 | 5/1978 | Stoev et al. | 261/64 R |
| 4,129,145 | 12/1978 | Wynn | 137/541 |
| 4,218,407 | 8/1980 | Robertson | 261/64 R |
| 4,326,478 | 4/1982 | Holmes | 114/183 R |
| 4,344,427 | 8/1982 | Marvin | 128/200.25 |
| 4,534,914 | 8/1985 | Takahashi et al. | 261/64 B |
| 4,612,876 | 9/1986 | Tigert | 119/5 |
| 4,823,828 | 4/1989 | McGinnis | 137/102 |
| 5,054,423 | 10/1991 | Escobal | 119/5 |
| 5,307,529 | 5/1994 | Wang | 4/585 |
| 5,416,994 | 5/1995 | McLaughlin | 446/267 X |
| 5,601,112 | 2/1997 | Sekiya et al. | 137/512.15 |
| 5,676,823 | 10/1997 | McKay et al. | 209/170 |

*Primary Examiner*—Robert A. Hafer
*Assistant Examiner*—Laura Fossum
*Attorney, Agent, or Firm*—Ronald E. Smith

[57] ABSTRACT

A device that produces toroidal bubbles of gaseous fluid when operated in immersed relation to a body of liquid fluid. A first embodiment is operated by a person who blows into a first end of the device with a short burst of air, and a second embodiment is operated by a pneumatic pump that delivers a short burst of air to the first end. A normally closed valve such as a poppet valve is positioned on a second end of the device. The valve opens and closes very rapidly in response to the burst of air. Air escaping around the peripheral border of the valve creates a toroidal bubble that expands in volume as it approaches the surface of the liquid fluid; the effect is visually pleasing. The valve of the device may also be held in the mouth, eliminating the conduit. In additional embodiments, the source of gaseous fluid is any pneumatically-charged device.

4 Claims, 3 Drawing Sheets

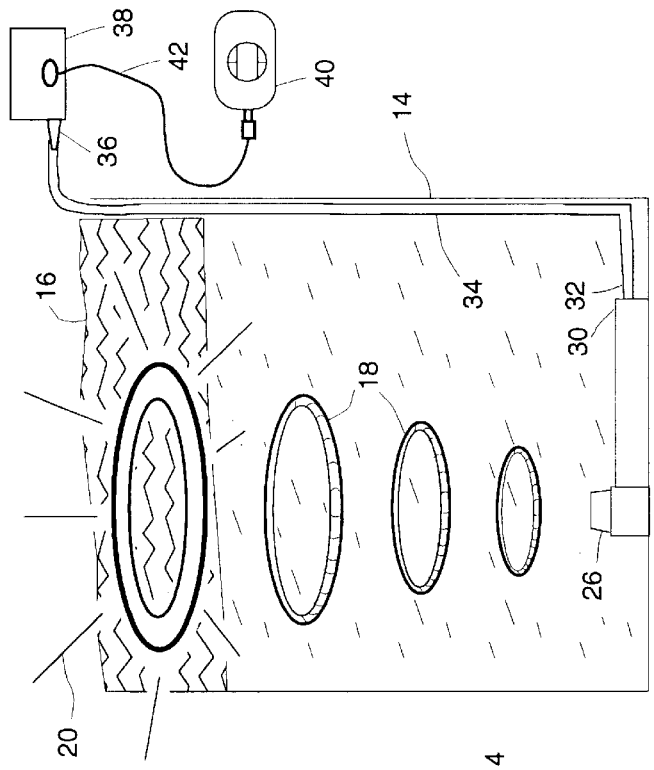
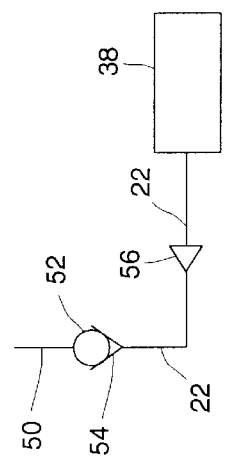
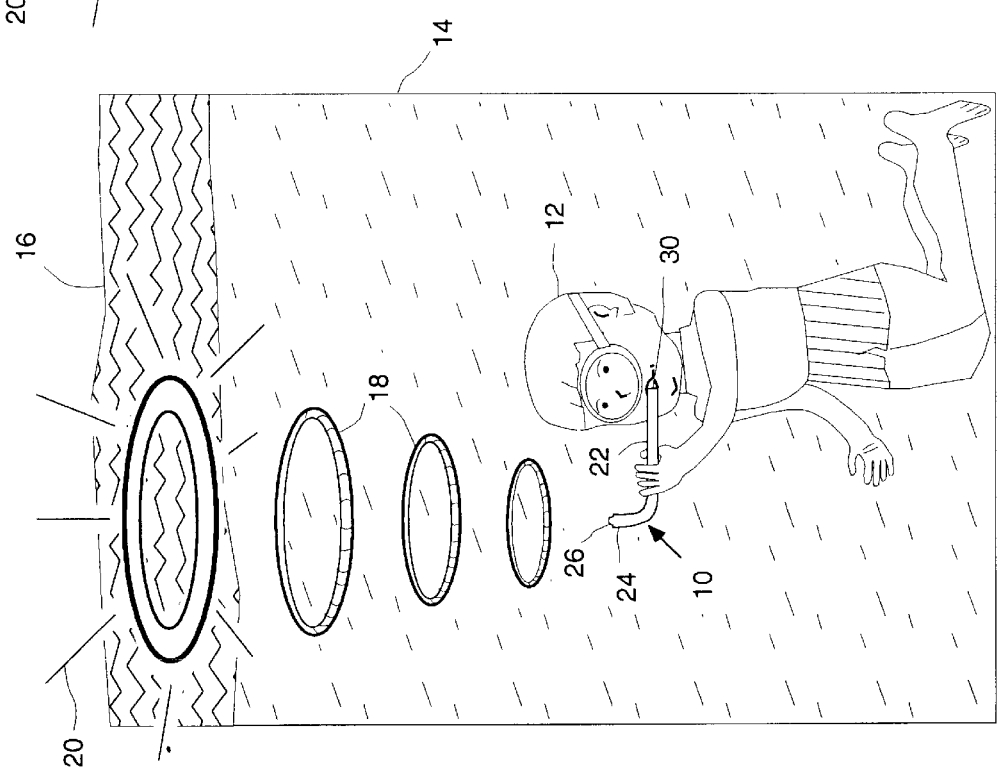
FIG. 2
FIG. 3
FIG. 1

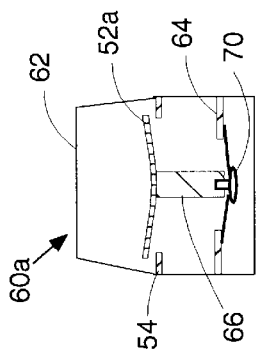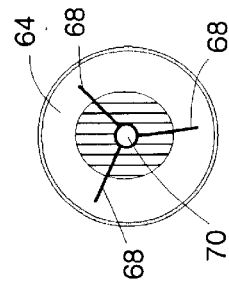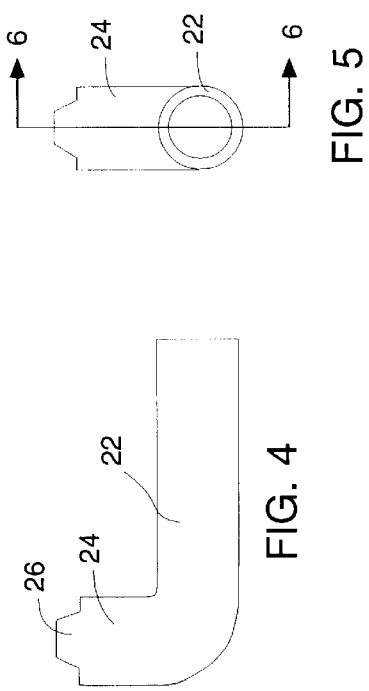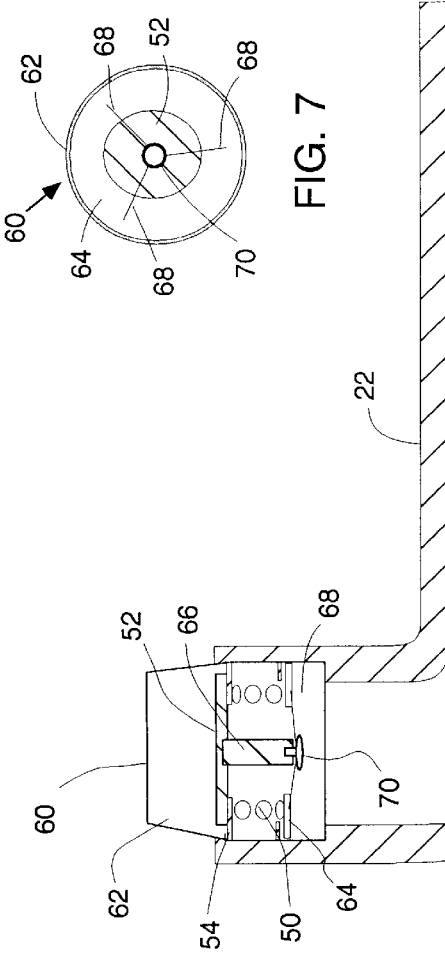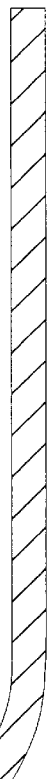

APPARATUS FOR PRODUCING TOROIDAL BUBBLES AND METHOD

BACKGROUND OF THE INVENTION

1. Field of the Invention

This invention relates, generally, to mechanical devices that produce visual effects. More particularly, it relates to a device that produces toroidal-shaped bubbles when operated while immersed in a liquid medium.

2. Description of the Prior Art

Some people who smoke cigars, cigarettes or pipes are able to blow smoke rings by holding their lips a certain way and exhaling with a brief puff. The present inventor, after extended practice and multiple attempts, successfully duplicated that effect under water by forming his mouth a certain way and exhaling with a brief puff; the result was a toroid or ring of air that ascended to the surface of the water, expanding in size as it approached the surface, and making a distinctive sound upon breaking the surface.

The effect is visually entertaining, but most individuals cannot perform the feat without considerable practice, nor can the effect be produced a large number of times in succession without a mechanical aid. Accordingly, the present inventor began work on a mechanical device that would facilitate the formation of underwater air rings.

After work had begun, a report appeared in the news media that dolphins in Hawaii had been observed blowing air rings under the water. Apparently, they do so for entertainment purposes.

There are no known mechanical devices that facilitate the formation of toroidal air bubbles under water or other liquids. Apparently, the only prior art is the inventor's and the dolphin's physical production of the rings.

In view of the highly attractive and entertaining appearance and behavior of the ring-shaped air bubbles, a device that would enable everyone, including children, to produce them substantially without effort and extended practice would be desireable.

However, in view of the art considered as a whole at the time the present invention was made, it was not obvious to those of ordinary skill in this art how the needed device could be provided.

SUMMARY OF THE INVENTION

The longstanding but heretofore unfulfilled need for such a device is now met by a new, useful, and nonobvious apparatus that produces bubbles of a predetermined shape when the device is positioned under water and when a short burst of air or other gaseous fluid is introduced into a first end thereof.

The novel apparatus preferably includes an elongated conduit having a first end adapted for fluid communication with a source of air or other suitable gaseous fluid under pressure. A normally closed valve means is secured to a second end of the conduit; the valve means has a predetermined cracking pressure and includes a valve body of predetermined geometrical configuration supported at its peripheral edges by a valve seat of predetermined geometrical configuration. The valve means is adapted to open for a brief predetermined amount of time when a burst of gaseous fluid under pressure is applied to it so that the bias means closes the valve means shortly after the valve body is unseated from the valve seat. The valve means is positioned substantially parallel to a surface of the body of water or other liquid fluid within which the device is immersed when the burst of gaseous fluid momentarily unseats the valve body. Thus, gaseous fluid escapes around the valve body at its peripheral edges during a brief time interval when the valve body is unseated from the valve seat so that escaping gaseous fluid is visible to observers of the body of liquid fluid.

The source of gaseous fluid under pressure may be a pneumatic pump or other mechanical apparatus; this avoids the need for human operation and enables the device to operate continuously in an aquarium, fountain, swimming pool or other such environment. Any pneumatically-charged device, such as a scuba tank, an inflated inner tube, and the like, may serve as a source of compressed gaseous fluid.

In one embodiment, the conduit is "L"-shaped so that a person introducing air into the conduit may orient the valve means in a plane substantially parallel to the water surface while maintaining their nose in an upstanding position to avoid water introduction thereinto. In another embodiment, the conduit means may be straight and oriented in a substantially vertical plane. The conduit may also be eliminated and the valve means held in the mouth of the user (manual operation) or directly mounted to a source of gaseous fluid under pressure (mechanical operation). In still another embodiment, a manifold interconnects a plurality of the devices so that different designs may be generated. For example, the words "Holiday Inn®" could be spelled out in a hotel swimming pool, or a corporate logo could be produced, and so on. A plurality of the novel devices can also be sequentially activated to achieve an effect.

A pneumatically-charged device or other source of gaseous fluid under pressure could be connected to a valve means that is immersed within an oil such as kerosene, and the oil reservoir could serve as the base of a lamp, a novelty item, or the like so that the expanding toriodal display could be enjoyed on a desk top or other non-aquatic environment.

In all embodiments, the valve means may be provided in the form of a poppet valve having a bias means for maintaining it in its normally closed position. The valve means may also be provided in the form of a flapper valve having a flexible and resilient valve body that maintains the normally closed position due to an inherent bias of the valve body. Numerous equivalent valves or valve means, including nonvalve devices that perform a valving function, may be used as well.

The valve body is preferably flat and round, but it may be of any other predetermined geometrical configuration. Similarly, the valve seat may be of any predetermined geometrical configuraton but it is preferably annular.

The device may be used to teach beginning swimmers how to swim because they will be strongly motivated to operate the device in view of its highly pleasing effects. Thus, people who see no reason to place their head under water will want to do so to operate the novel device. Placing one's head under water, holding one's breath, and breathing out while still under water are the first steps in learning how to swim. Playing with the novel device under water also gets one used to the underwater environment.

Use of the device is not limited to aquariums, swimming pools and fountains; it may also be used in ponds, lakes, jacuzzis and other bodies of water and in other liquid fluid mediums as well. It may be used while swimming, scuba diving, boating, fishing, and so on. It could also be used in Olympic synchronized swimming competitions and in desk-top novelty items as mentioned earlier. Other applications, whether specifically mentioned herein or not, are of course within the scope of this invention as a matter of law.

It is a primary object of this invention to provide a mechanical device that enables an individual to produce toroidal air bubbles under water.

Another object is to provide a mechanical device that produces such bubbles without human assistance.

Another object is to provide a device that encourges non-swimmers to learn how to swim.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of a child using the novel device while immersed;

FIG. 2 is a perspective view of a mechanically-aided embodiment of the invention;

FIG. 3 is a schematic view of the mechanically-aided embodiment;

FIG. 4 is a side elevational view of the novel device;

FIG. 5 is an end elevational view thereof;

FIG. 6 is a sectional view taken along line 6—6 in FIG. 5;

FIG. 7 is a bottom plan view of the poppet valve depicted in FIG. 6;

FIG. 8A is a sectional, side elevational view of a flapper valve;

FIG. 8B is a bottom plan view of the flapper valve depicted in FIG. 8A;

DETAILED DESCRIPTION OF THE PREFERRED EMBODIMENT

Figure 10:
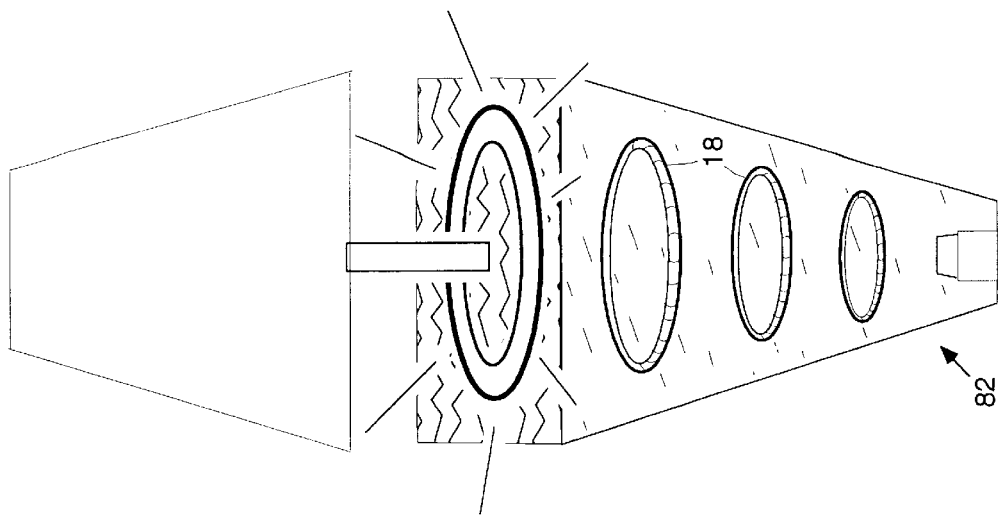
FIG. 10 depicts the novel device when used to provide a table lamp having an entertaining display of the novel toroidal bubbles.

Referring now to FIG. 1, it will there be seen that an exemplary embodiment of the invention is denoted as a whole by the reference numeral 10. In this particular environment, a child 12 is operating device 10 while immersed in a swimming pool 14 having a surface 16. Multiple toroidal rings, collectively denoted 18, have been produced by the child blowing short bursts of air into device 10; note that each ring 18 expands in volume as it approaches surface 16. Radiating lines 20 indicate that the air in each ring is released abruptly into the atmosphere as each ring breaks water surface 16. A distinctive sound accompanies each bubble dissipation.

Note that device 10, in this particular embodiment, has an elongate part 22 and a truncate part 24 that is disposed normal thereto and which is integrally formed therewith. A one-way valve 26 is connected to truncate part 24 at the free end of said truncate part 24. When a device of this structure is used, elongate part 22 is held substantially horizontally so that truncate part 24 is disposed in a substantially vertical plane and so that one-way valve 26 is substantially parallel to water surface 16, i.e., so that one-way valve 26 surmounts said truncate part 24. However, said valve need not be positioned in a plane that is substantially parallel to the surface, i.e., it can be held in virtually any predetermined relation to the surface of a liquid fluid.

As will become more clear as this description proceeds, device 10 could be provided in a straight configuration, but its operator would then have to orient device 10 in a vertical plane and take steps to avoid water entry into the nasal passages.

As will also become more clear hereinafter, one-way valve 26 can be held in the mouth (or in fluid communication with any other source of gaseous fluid under pressure) and operated without the benefit of elongate part 22 and truncate part 24. Parts 22 and 24 should therefore be understood as providing a convenient handle to facilitate operation of valve 26; if the valve 26 is held in the mouth, the user must take steps to avoid water introduction into the nostrils, as in the case where a straight conduit is used to engage said valve as mentioned above.

The physical effort required to produce pneumatic O-rings by using the device of FIG. 1 is substantially less than the effort required to make such rings without the assistance of device 10. However, where it is desired to observe a continuing series of such pneumatic rings, it is not practical to rely upon a human using no mechanical aids as the source of gaseous fluid under pressure. Instead, a mechanical means of some sort is preferable if device 10 is to be operated for extended periods of time.

As depicted in FIG. 2, a mechanically-aided device 10 may be positioned in a natural body of water, an aquarium, a swimming pool, a jacuzzi, an oil-filled lamp base, and the like, all of which are indicated by reference numeral 14. Note that the depicted embodiment of the conduit is somewhat L-shaped like the conduit of FIG. 1, but that a straight, upstanding conduit would work equally well.

Short bursts of air are introduced into proximal end 30 of device 10 in the human-powered embodiment of FIG. 1 and in the mechanically-aided embodiment of FIG. 2, although any other suitable gaseous fluid could be employed in said mechanically-aided embodiment. In the FIG. 2 embodiment, the distal end 32 of an elongate flexible air hose 34 is connected to proximal end 30 of device 10; the proximal end 35 of said air hose is connected to output 36 of pneumatic pump 38 which produces short bursts of air under pressure. Pump 38 is under the control of timer 40 and is electrically connected thereto by electrical cord 42. The pump and timer may be integrated into a single device.

The mechanical aid need not be a pneumatic pump; it could be any pneumatically-charged device such as a scuba tank, an inflated inner tube, and the like (which could be mounted on dry land or immersed in the body of liquid fluid) or other source of gaseous fluid under pressure. A person could also stand out of the water and blow into the proximal end 35 of hose 34; there is no requirement that a human must be immersed whenever the novel device is human-operated.

FIG. 3 provides a schematic view of the embodiment of FIG. 2. A bias means 50 holds valve body 52 in sealing relation to valve seat 54 until the sum of the cracking pressure of the valve and the liquid columb pressure are overcome by air in passageway 22 which is in fluid communication with a source 38 of compressed gaseous fluid. The direction of airflow is indicated by flow arrow 56.

FIGS. 4 and 5 provide a side elevational and an end view, respectively, of the preferred embodiment of device 10.

FIG. 6 depicts a poppet valve assembly 60 which is mounted in a valve housing 62. Valve body 52 seats against valve seat 54 when the valve means is closed. Bias means 50 urges said valve means into its closed position; accordingly, to open said valve means, a short burst of gaseous fluid must be introduced through passageway 22 at a sufficient pressure to momentarily overcome bias means 50 and the columb pressure of the liquid fluid. Bias means 50 is anchored to base 64 by central post 66 which is secured to radially-disposed fingers 68 by retainer 70. Stop means 65 retains base 64 within housing 62. Thus, the valve is closed by bias means 50 (and liquid column pressure) just a fraction of a second after it opens if a short burst of gaseous fluid is properly introduced into passageway 22. The training required to produce a short burst of air is nominal when compared to the training required to produce the pneumatic rings without a mechanical aid.

A bottom view of poppet valve 60 is provided in FIG. 7. There it will be seen that radially disposed fingers 68 are narrow in construction so that gaseous fluid can easily flow therepast and impinge upon valve body 52.

A flapper valve assembly 60a is depicted in FIGS. 8A and 8B. Valve body 52a is made of a flexible but resilient material so that its peripheral edges are momentarily lifted from valve seat 54 when a short burst of gaseous fluid is applied thereto. Thus, no external bias means such as bias means 50 is employed in this embodiment; valve body 52a provides its own bias means in view of its resiliency, i.e., said valve body 52a has an inherent bias.

Note that poppet valves and flapper valves are both check valves; thus, liquid fluid cannot flow therethrough in a direction opposite to the flow of gaseous fluid therethrough.

Both poppet valves and flapper valves are well-known in the art and therefore need not be described in further detail. Those skilled in the mechanical arts will appreciate that many other suitable valves could be used as poppet and flapper valve substitutes; all of such substitute valves are clearly within the scope of this invention. Moreover, any nonvalve means for providing a controlled burst of gaseous fluid is also within the scope of this invention.

In the preferred embodiment of this invention, valve bodies 52 and 52a are of imperforate, circular construction, and valve seat 54 is of annular construction so that valve body 52 or 52a is supported at its peripheral edge by said valve seat 54. It should be understood that the valve body need not be of circular configuration, and that the valve seat need not be of annular configuration. However, it is believed that the circular/annular configuration of the valve body/seat, respectively, helps produce the toroidal configuration of the pneumatic toroids depicted in FIGS. 1 and 2, i.e., an octagonal valve body and an octagonal valve seat might produce bubbles having an octagonal shape, but this has not yet been tested. Empirical studies would confirm or disprove this hypothesis. Significantly, this invention is not restricted to a circular valve body or an annular valve seat, i.e., the valve body and valve seat may be of any predetermined geometrical configuration.

The novel method of this invention includes the steps of connecting a first end of a conduit means to a source of gaseous fluid under pressure, connecting a first end of a normally closed valve means to a second end of the conduit means, positioning a second end of the valve means in preselected relation to a surface of a body of liquid fluid within which the valve means is immersed, and briefly opening said valve means by introducing a burst of gaseous fluid under pressure into the conduit means so that a valve body of said valve means is momentarily unseated from a valve seat of said valve means so that the burst of gaseous fluid escapes the conduit means by traveling around the perimeter of the valve body into the body of liquid fluid.

The method of this invention also includes the step of eliminating the conduit means of this invention and holding the valve means in one's mouth instead, as mentioned earlier. As will be clear from FIGS. 7, 8A, and 8B, the valve means may be retained in a person's mouth by simply biting down on it or by otherwise retaining it such as by holding it between one's lips. A short burst of air through the valve will then produce the desired toroidal bubble, even though no "L"-shaped or straight conduit has been employed. Accordingly, the conduit means is not an essential element of the invention; it merely facilitates the formation of the toroidal bubbles.

Figure 9A:
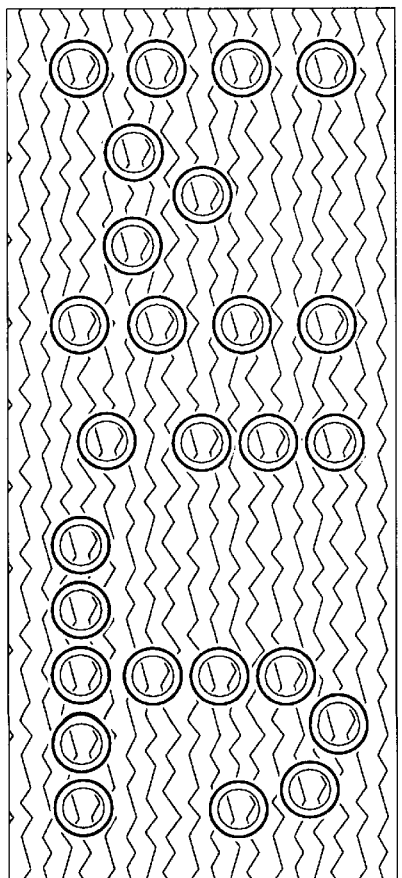
FIG. 9A is a top plan view of a body of water having a manifold embodiment of the invention immersed therein.
Figure 9B:
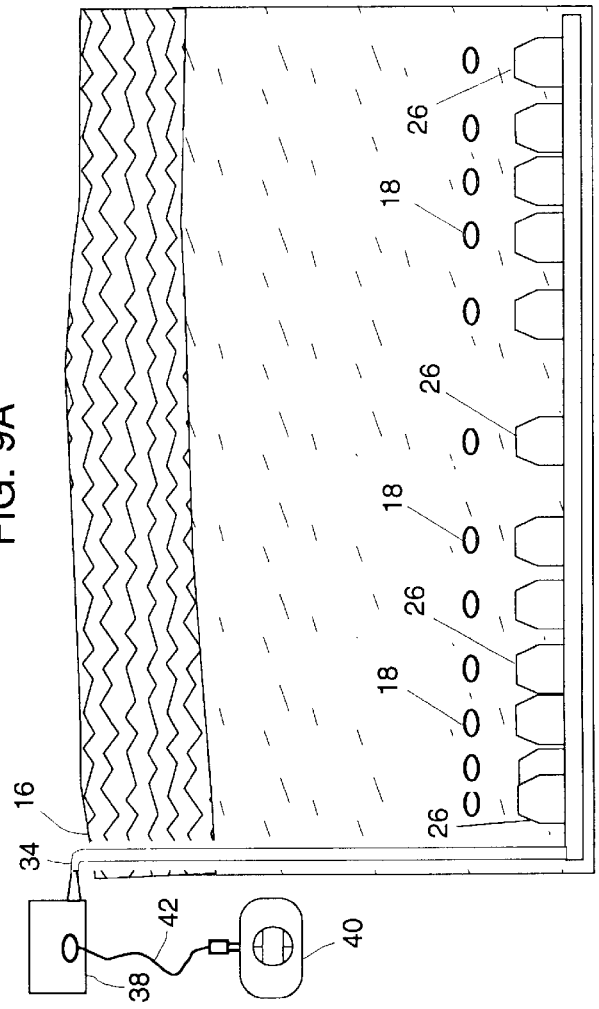
FIG. 9B is a side elevational view of the FIG. 9A embodiment.

FIGS. 9A and 9B depict yet another embodiment. A plurality of valve means are connected to one another in a manifold arrangement to enable simultaneous (or nonsimultaneous) operation of a plurality of the devices; the manifold is denoted 80 as a whole. This enables a designer to create geometric designs such as corporate logos, spell out words, and so on with the novel device. Such a device, for example, could form the Olympic rings, spell out "Welcome," and the like; FIG. 9A shows a pool surface in plan view when the name "JIM" is spelled out by the toroidal bubbles.

The same effect can be achieved by positioning a plurality of the novel devices 10 in a predetermined array on the bottom of a body of water, but then each device must be individually supplied with short bursts of gaseous fluid under pressure. Use of manifold 80 facilitates simultaneous or nonsimultaneous operation of a plurality of the devices while employing a single source of gaseous fluid under pressure such as pneumatic pump 38 or a pneumatically-charged device. In nonsimultaneous operation, individual devices are sequentially activated randomly or in a predetermined sequence to produce visual effects.

The table lamp 82 of FIG. 10 provides a visually pleasing display of the novel toroidal rings. This clearly establishes that the versatility of the invention is unlimited; it may take many other forms not specifically shown or described herein, but all applications of the present invention are covered by the claims that follow.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for forming bubbles in a body of liquid fluid, comprising the steps of:

connecting a first end of a normally closed valve means to a source of gaseous fluid under pressure;

positioning a second end of said valve means in predetermined relation to a body of liquid fluid within which said valve means is immersed;

providing a valve seat to support a valve body of said valve means at a periphery of said valve body; and momentarily separating said valve body from said valve seat by introducing a burst of gaseous fluid into said first end of said valve means so that said valve body is momentarily spaced apart from said valve seat so that the burst of gaseous fluid escapes the valve means by traveling around the periphery of the valve body into the body of liquid fluid, thereby forming bubbles of a predetermined geometric configuration.

2. The method of claim 1, further comprising the steps of:

arranging a plurality of said normally closed valve means into a predetermined pattern;

providing gaseous fluid communication between all of said normally closed valve means of said plurality of normally closed valve means; and providing gaseous fluid communication between said source of gaseous fluid under pressure and said plurality of said normally closed valve means.

3. A method for forming bubbles in a body of liquid fluid, comprising the steps of:

connecting a first end of a conduit means to a source of gaseous fluid under pressure;

connecting a first end of a normally closed valve means to a second end of the conduit means;

positioning a second end of said valve means in predetermined relation to a surface of a body of liquid fluid within which said valve means is immersed;

providing a valve seat to support a valve body of said valve means at a periphery of said valve body; and briefly opening said valve means by introducing a burst of gaseous fluid into the conduit means so that said valve body is momentarily unseated from said valve seat so that the burst of gaseous fluid escapes the conduit means by traveling around the periphery of the valve body into said body of liquid fluid, thereby forming bubbles of a predetermined geometric configuration.

4. The method of claim 3, further comprising the steps of:

arranging a plurality of said normally closed valve means into a predetermined pattern;

providing gaseous fluid communication between all of said normally closed valve means of said plurality of normally closed valve means; and providing gaseous fluid communication between said source of gaseous fluid under pressure and said plurality of said normally closed valve means.

* * * * *